(12) United States Patent
Ikarashi

(10) Patent No.: US 8,672,324 B2
(45) Date of Patent: Mar. 18, 2014

(54) PRINTING APPARATUS AND PRINTED-MATERIAL PROCESSING APPARATUS

(75) Inventor: Yumi Ikarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/963,061

(22) Filed: Dec. 8, 2010

(65) Prior Publication Data

US 2011/0233852 A1 Sep. 29, 2011

(30) Foreign Application Priority Data

Mar. 26, 2010 (JP) ................................. 2010-071939

(51) Int. Cl.
*B65H 29/00* (2006.01)
(52) U.S. Cl.
USPC .......................... 271/279; 271/288; 271/289
(58) Field of Classification Search
USPC .................................. 271/290, 279, 288, 289
See application file for complete search history.

(56) References Cited

U.S. PATENT DOCUMENTS

| | | | | |
|---|---|---|---|---|
| 4,295,733 A | * | 10/1981 | Janssen et al. | 399/403 |
| 5,822,075 A | * | 10/1998 | Kaneko et al. | 358/296 |
| 5,898,592 A | * | 4/1999 | Salgado et al. | 700/214 |
| 6,009,804 A | * | 1/2000 | Yamada | 101/2 |
| 6,456,386 B1 | * | 9/2002 | Watanabe et al. | 358/1.12 |
| 7,245,871 B2 | * | 7/2007 | Kasahara | 399/405 |
| 8,002,259 B2 | * | 8/2011 | Kishimoto et al. | 271/9.01 |
| 8,254,794 B2 | * | 8/2012 | Shiraki et al. | 399/23 |
| 2009/0315249 A1 | * | 12/2009 | Yamanaka et al. | 271/9.01 |

FOREIGN PATENT DOCUMENTS

| | | |
|---|---|---|
| JP | 58-130859 A | 8/1983 |
| JP | 2000-001258 A | 1/2000 |
| JP | 2000-318913 A | 11/2000 |
| JP | 2002-037520 A | 2/2002 |
| JP | 3617752 B2 | 2/2005 |

* cited by examiner

*Primary Examiner* — Michael McCullough
*Assistant Examiner* — Howard Sanders
(74) *Attorney, Agent, or Firm* — Canon USA, Inc., IP Division

(57) ABSTRACT

A stack state of a plurality of trays is collectively determined and is notified in steps. A printing apparatus includes an image forming unit configured to form an image on a sheet and create a printed material, a plurality of storage units each configured to store the printed material created by the image forming unit, a sorter unit configured to output the printed material to the plurality of storage units, and a determining unit configured to determine whether the plurality of storage units are in a nearly full state in which printed material is stored in almost all of the plurality of storage units.

16 Claims, 12 Drawing Sheets

PRINTING APPARATUS AND PRINTED-MATERIAL PROCESSING APPARATUS

BACKGROUND OF THE INVENTION

1. Field of the Invention

The present invention relates to a printing apparatus including a plurality of paper output trays and an image printing unit and to a printed-material processing apparatus.

2. Description of the Related Art

In the related art, printing apparatuses including a plurality of paper output trays detect a stack limit of each tray based on a stack state of the tray determined using a paper detecting sensor on the paper output tray or by counting the number of output papers after detection of a plurality of number of output papers. Upon detecting that the tray is full, the printing apparatuses notify users of occurrence of a full state through a display panel to allow the users to recognize the state.

In Japanese Patent Registration No. 03617752, a control operation is executed in a following manner. A stack state is detected for each tray. If a tray currently receiving output papers becomes full, the paper output destination is sequentially switched to an available tray, so that termination of printing is avoided as much as possible.

However, when the full state is detected for each tray and the message for notifying the users of the full state is displayed on the display panel for each tray, the number of displayed messages increases as the number of paper output trays increases. In particular, when a plurality of full trays exist, as many messages as the full trays are displayed. In such a state, the users have difficulty in recognizing the full trays.

When an emphasized error notification is issued to users after all of the trays become full, printing processing unfortunately stops because no paper output destination is found. In particular, the emphasized error notification issued after all of the trays become full prevents users working apart from the printing apparatuses from knowing beforehand that the printing processing is about to stop.

SUMMARY OF THE INVENTION

According to an exemplary embodiment of the present invention, whether trays are full is collectively determined based on the number of trays storing stacked papers. An overall stack state of the trays is displayed on a display panel in steps. For example, when a printing apparatus includes ten trays, a nearly full warning is issued once the number of remaining vacant trays decreases to three, whereas a full state warning for all of the trays is issued once all of the ten trays become unavailable. In this way, the printing apparatus having the plurality of trays collectively determines whether all of the trays are full and briefly notifies users of the overall tray vacancy state to prompt the users to efficiently collect the output papers from the trays, so that termination of printing processing is avoided.

To overcome the above-described disadvantages, a printing apparatus according to an aspect of the present invention includes a following configuration.

A printing apparatus according to an aspect of the present invention includes an image forming unit configured to form an image on a sheet and create a printed material, a plurality of storage units each configured to store the printed material created by the image forming unit, a sorter unit configured to output the printed material to the plurality of storage units, and a determining unit configured to determine whether the plurality of storage units are in a nearly full state in which printed material is stored in almost all of the plurality of storage units.

As described above, in accordance with the aspect of the present invention, whether a plurality of trays are full is collectively determined, whereby users can efficiently collect output papers from the trays and termination of printing processing can be avoided.

Further features of the present invention will become apparent from the following description of exemplary embodiments with reference to the attached drawings.

DESCRIPTION OF THE EMBODIMENTS

Exemplary embodiments of the present invention will be described in detail below with reference to the accompanying drawings. Relative arrangement of elements and a shape of an apparatus described in the exemplary embodiments are illustrative only and the scope of this invention should not be limited to these examples.

Herein, "a print processing apparatus" includes not only a printing apparatus serving as a dedicated device having a printing function but also a multifunction peripheral having the printing function and other functions and manufacturing equipment forming images and patterns on a recording sheet. Exemplary embodiments indicate an example in which a printer performs mass printing using a roll sheet serving as a printing sheet. However, since the scope of the present invention relates to sorting of printed materials to trays and collection of the printed materials from the trays, the scope of the present invention is not limited by the roll sheet serving as the printing sheet.

(Basic Configuration)

Figure 1:
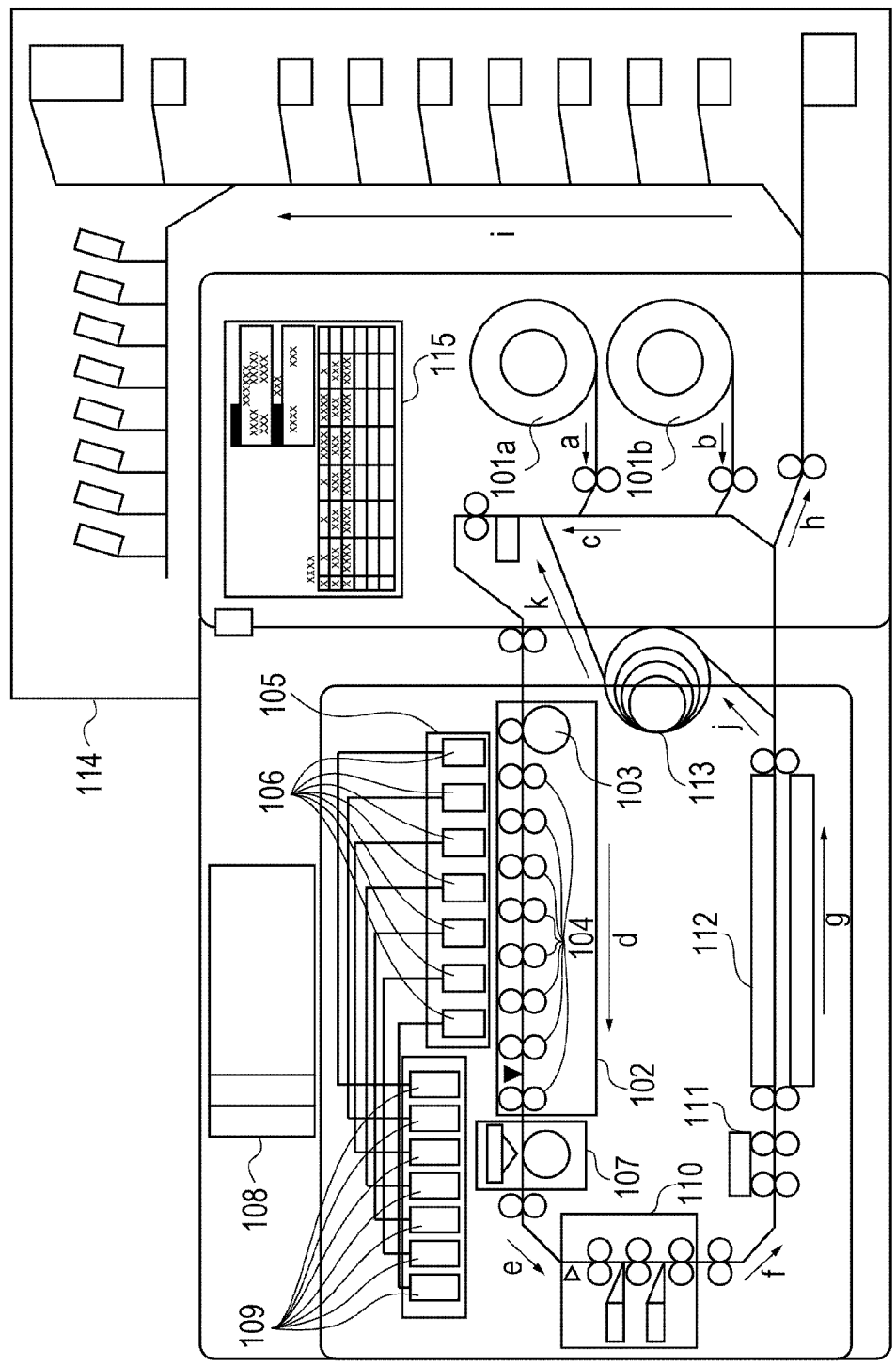
FIG. 1 is a sectional view illustrating a configuration of a print processing apparatus according to an exemplary embodiment of the present invention.

FIG. 1 is a sectional view of a configuration of a print processing apparatus using a roll sheet (i.e., a continuous sheet having a conveying-direction length longer than a unit length of printing). The print processing apparatus includes a roll sheet unit 101, a conveying unit 102, a conveying encoder 103, conveying rollers 104, a head unit 105, printing heads 106, a scanner unit 107. The print processing apparatus further includes a control unit 108, ink tanks 109, a cutter unit 110, a back-side printing unit 111, a dryer unit 112, a sheet winding unit 113, a sorter unit 114 serving as a printed-material processing apparatus, and an operation unit 115. The control unit 108 includes a control portion having a controller, user interfaces, and various input/output (I/O) interfaces. The control unit 108 manages various control operations of the print processing apparatus.

The roll sheet unit 101 includes two sheet cassettes, i.e., an upper sheet cassette 101a and a lower sheet cassette 101b. A sheet is fed from one of the sheet cassettes 101a and 101b. A user equips a magazine with a roll sheet (hereinafter, simply referred to as a sheet) and then inserts the magazine into the print processing apparatus from the front. The sheet from the upper sheet cassette 101a is conveyed in a direction of an arrow "a" illustrated in FIG. 1, whereas the sheet from the lower sheet cassette 101b is conveyed in a direction of an arrow "b" illustrated in FIG. 1. The sheet from the selected one of the sheet cassettes 101a and 101b is conveyed in a direction "c" illustrated in FIG. 1 to reach the conveying unit 102. The conveying unit 102 conveys the sheet in a direction "d" (i.e., the horizontal direction) illustrated in FIG. 1 with the plurality of pairs of conveying rollers 104 during printing.

The head unit 105 is located above the sheet conveyed by the conveying unit 102 to face a printing surface of the sheet. In the head unit 105, the plurality of independent printing heads 106 of a plurality of colors (seven colors in the exemplary embodiment) are held along a sheet conveying direction. In the exemplary embodiment, seven printing heads 106 for seven colors, i.e., cyan (C), magenta (M), yellow (Y), light cyan (LC), light magenta (LM), gray (G), and black (K) are held along the sheet conveying direction. In synchronization with conveying of the sheet by the conveying unit 102, the printing heads 106 eject ink to form an image on the sheet. The conveying unit 102, the head unit 105, and the printing heads 106 constitute a printer unit. The ink tanks 109 independently store ink of the respective colors. The ink of each color is supplied from the corresponding ink tank 109 to a sub tank provided for the corresponding color through a tube. The ink is then supplied from the sub tank to the corresponding printing head 106 through a tube. The printing heads 106 are line heads of the respective colors (seven colors in the exemplary embodiment) arranged along a conveying direction "d" in printing. The line head of each color may be formed of a single joint-free nozzle chip or separated nozzle chips regularly arranged in a row or zigzag. In this exemplary embodiment, the line head is a so-called full multi head having nozzles arranged to cover a width of a largest sheet to be used. As an ink-jet method for ejecting ink from a nozzle, one using a heater element, one using a piezoelectric element, one using an electrostatic element, and one using a microelectromechanical systems (MEMS) element can be adopted. Ink is ejected from the nozzle of each head based on print data in accordance with an output signal of the conveying encoder 103. The present invention is not limited to ink-jet printers and can be applied to printers of various printing methods, such as thermal printers (including a dye sublimation type and a thermal transfer type), dot impact printers, light emitting diode (LED) printers, and laser printers.

The sheet having the image formed by the printer unit is then conveyed from the conveying unit 102 to the scanner unit 107. The scanner unit 107 scans the image or a special test pattern printed on the sheet to determine whether the printed image is defect-free and to check a status of the apparatus. In this exemplary embodiment, the scanner unit 107 is used for creating correction data of the image. The image correction data can be created by printing a pattern for checking a state of the heads with the printer unit, scanning the pattern with the scanner unit 107, and analyzing the scanned data. Alternatively, the image correction data may be created by scanning the printed image with the scanner unit 107 based on image information, comparing the scanned data with the original image information, and analyzing the comparison result.

The sheet is conveyed from the scanner unit 107 in a direction "e" to reach the cutter unit 110. The cutter unit 110 cuts the sheet into a predetermined unit length of printing. The predetermined unit length of printing differs depending on the size of the image to be printed. For example, an L-size photo has a conveying-direction length of 135 mm, whereas an A4-size sheet has a conveying-direction length of 297 mm.

The sheet is then conveyed in the cutter unit 110 in an illustrated direction "f" to reach the back-side printing unit 111 from the cutter unit 110. The back-side printing unit 111 is for printing information regarding each printed image (e.g., an order management number).

The sheet is conveyed from the back-side printing unit 111 to the dryer unit 112. The dryer unit 112 heats the sheet passing therethrough in an illustrated direction "g" with warm air to dry the ink on the sheet in a short time. Each page of the sheet passes through the dryer unit 112 and is conveyed in an illustrated direction "h" to reach the sorter unit 114.

The sorter unit 114 stacks the sheets passing therethrough in an illustrated direction "i" on corresponding trays having numbers set for the printed images while checking the sheets with sensors. The sorter unit 114 includes a plurality of trays (22 trays in this exemplary embodiment). The sorter unit 114 selects a tray for stacking the sheet in accordance with the unit length of printing. The sorter unit 114 also displays a status, such as now stacking and stacking completed (e.g., using LEDs). The sorter unit 114 will be described in detail later.

A procedure of duplex printing on a sheet will now be described. The printer unit prints images on a first side of a sheet from the sheet cassette 101a or 101b. The sheet having the printed images is then conveyed to the scanner unit 107, the cutter unit 110, and the dryer unit 112. At this time, the cutter unit 110 does not cut the sheet for each image.

The printer unit continuously forms, on the first side of the sheet, a group of images to be printed on the first side belonging to a job including a plurality of images and a job group including a plurality of jobs. The cutter unit 110 cuts the sheet at a point where the group of images printed on the first side of the sheet ends.

A leading end of the sheet having passed the dryer unit 112 is guided to the sheet winding unit 113. The sheet winding unit 113 includes a winding rotational body (e.g., a drum) for winding the sheet and a clamp for temporally fixing the leading end of the sheet onto the winding rotational body. Once the clamp fixes the leading end of the sheet onto the winding rotational body, the winding rotational body rotates counter-clockwise in FIG. 1 to wind the sheet. Depending on the number of images to be printed, the printer unit keeps printing the images on an upstream side of the sheet during winding. After the sheet winding unit 113 finishes winding the sheet to reach a trailing end of the sheet cut by the cutter unit 110, the trailing end of the wound sheet is then conveyed in a direction "k" from the sheet winding unit 113. That is, the trailing end of the sheet cut by the cutter unit 110 is now conveyed to the printer unit as a leading end.

The printing heads 106 oppose to a second side, i.e., a side opposite to the first side having the recorded images, of the sheet conveyed to the printer unit. The printing heads 106 sequentially and continuously print, on the second side of the sheet, images to be printed on the back side of the images printed on the first side.

The sheet is then conveyed to the scanner unit 107 and the cutter unit 110 from the printer unit. The cutter unit 110 cuts the sheet for each image. The cutter unit 110 then sends each printed material having undergone duplex printing to a downstream side. The cut pieces of the sheet are conveyed to the sorter unit 114 through the dryer unit 112.

In duplex printing, images are first formed on the front side of the sheet. The cutter unit 110 does not cut the sheet for each image. The sheet is then conveyed in an illustrated direction "j" and wound by the sheet winding unit 113. After all of the images are formed on the front side, the sheet winding unit 113 conveys the wound sheet in the illustrated direction "k" therethrough so that back-side image printing is executed.

The operation unit 115 allows users to check a printing status of each order, such as a tray storing images of a specified order and whether printing is underway or finished, and a status of the apparatus, such as an amount of remaining ink and an amount of remaining sheet. Operators operate/check the operation unit 115 to perform apparatus maintenance, such as head cleaning. The operation unit 115 includes keys to be operated, a liquid crystal display displaying the apparatus status, and LEDs indicating errors of the apparatus.

Figure 2:
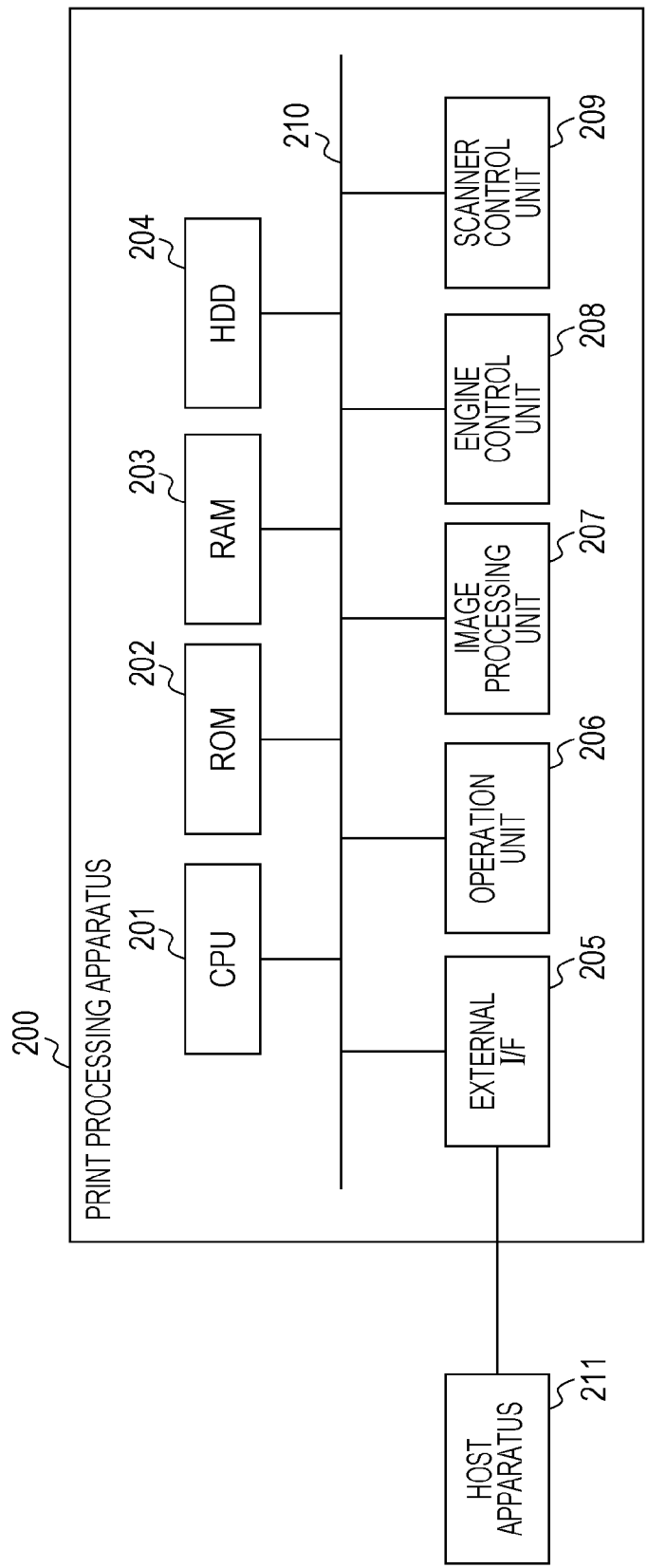
FIG. 2 is a block diagram for describing a control configuration of the print processing apparatus.

FIG. 2 is a block diagram for describing a control configuration of a print processing apparatus 200 employed in this exemplary embodiment. The print processing apparatus 200 includes a central processing unit (CPU) 201, such as a microcomputer, and a read-only memory (ROM) 202 storing programs, tables, and other fixed data. The print processing apparatus 200 also includes a random access memory (RAM) 203 having areas for control commands received from a host apparatus 211 and an work area and a hard disk drive (HDD) 204 temporarily storing image data supplied from the host apparatus 211 and the tables.

An operation unit 206 is a block for controlling the operation unit 115. The operation unit 206 controls the display for displaying the apparatus status, the keys, and the LEDs and allows operators to input operation instructions, register various pieces of data, and check the apparatus status.

An image processing unit 207 manages image processing in the print processing apparatus 200. More specifically, the image processing unit 207 converts a color space (e.g., YCbCr) of image data into a standard RGB color space (e.g., sRGB). The image processing unit 207 also executes various kinds of image processing, such as resolution conversion into the number of effective pixels, image analysis, and image correction. Print data resulting from the image processing is stored in the RAM 203 or the HDD 204.

An engine control unit 208 controls printing of the print data on a recording medium in accordance with received control commands. More specifically, the engine control unit 208 instructs the printing head of each color to eject ink, sets ejection timing to adjust a position of a dot on the recording medium, and acquires a head driving state. That is, the engine control unit 208 controls driving of the printing heads in accordance with the print data to cause the printing heads to eject ink and form an image on the recording medium. The engine control unit 208 also controls the conveying rollers, such as instructing driving of feeding rollers, instructing driving of the conveying rollers, and acquiring a rotation state of the conveying rollers, so that the recording medium is conveyed at an appropriate speed and stopped. The engine control unit 208 also controls the sorter unit 114. More specifically, the engine control unit 208 controls a paper-absence sensor of each tray of the sorter unit 114, a solenoid for switching paper output trays, and LEDs of each tray.

A scanner control unit 209 controls image sensors, such as a charge coupled device (CCD) and a contact image sensor (CIS), in accordance with received control commands to scan an image on the recording medium and acquire analog luminance data of red (R), green (G), and blue (B). More specifically, the scanner control unit 209 instructs driving of the image sensors, acquires statuses of the image sensors, analyzes the luminance data acquired from the image sensors, and detects an ink ejection failure and a cut position of the recording medium.

The host apparatus 211 is externally connected to the print processing apparatus 200 and supplies images to the image forming apparatus 200. The host apparatus 211 may be a computer creating and processing data of images to be printed or a scanner for scanning images. The print processing apparatus 200 can receive image data and other commands supplied from the host apparatus 211 and send status signals to the host apparatus 211 through an external interface (I/F) 205. The blocks included in the print processing apparatus 200 are connected with each other through a system bus 210. The control configuration is not limited to the one described in this exemplary embodiment. Each of the processing units and the control units may be divided into a plurality of portions and each of the divided portions may include a CPU to execute control operations. However, the control method is not limited to these examples.

Figure 3:
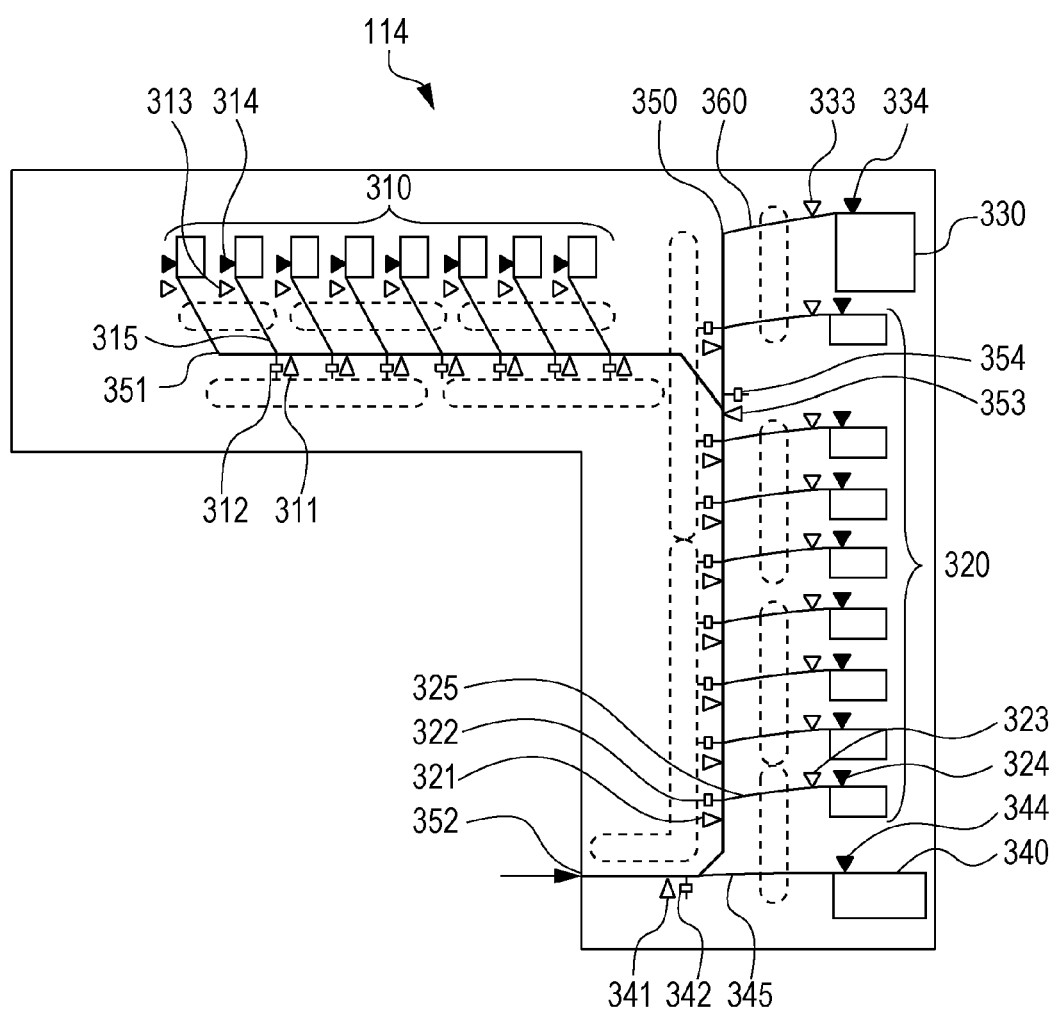
FIG. 3 is a diagram schematically illustrating a configuration of a sorter unit.

FIG. 3 is a diagram schematically illustrating a configuration of the sorter unit 114 serving as a printed-material processing apparatus. A printed material having been printed, cut, and dried enters the sorter unit 114 from an entrance at a bottom part thereof and is stacked on a tray serving as a sorting-destination storage unit specified by the print processing apparatus 200. Printed materials of each job are collectively output to a tray. When plurality of groups of printed materials are printed in one job, the printed materials of each group are collectively output to a tray similarly.

The sorter unit 114 has a plurality of kinds of trays, such as trays intended for storing different-sized printed materials and trays for storing printed materials for a specific purpose.

Small trays 310 are used for outputting small printed materials. Large trays 320 are generally used for outputting large printed materials but can be used for outputting the small printed materials. Image data of a print job includes size data of a printed material. The sorter unit 114 includes more than one small tray 310 and more than one large tray 320. In accordance with the size data, the sorter unit 114 specifies the size of an output destination tray. A temporary tray 330 is larger than the large trays 320. The temporary tray 330 can store printed materials that do not fit into the large trays 320. The temporary tray 330 can also serve as a temporary output destination when other trays are unavailable. Users can select whether to use, as the temporary sorting destination, the temporary tray 330 serving as a second storage unit through the operation unit 115 when the small trays 310 and the large trays 320 are unavailable. Printed materials other than products of printing, such as ones having special patterns that are no longer needed after being scanned by the scanner unit 107, are output to a tray 340.

A conveying path of printed materials is generally categorized into two kinds (hereinafter, referred to as "a main path"

and "a sub path"). A printed material enters the sorter unit 114 from a sorter entrance 352 and goes along main paths 350 and 351. Sub paths branch off from the main paths 350 and 351 to guide the printed material to each tray. The sub path is provided for each tray.

A printed material having entered the sorter unit 114 travels along the main paths 350 and 351. The conveying path is switched by a conveying path switch in front of a sorting-destination tray and the printed material enters the sub path. When one of the large trays 320 is selected as the sorting destination of the printed material, a conveying path switch 322 switches the path of the printed material from the main path 350 to a sub path 325 of the selected large tray 320. The printed material is output to the selected large tray 320 through the sub path 325 of the selected large tray 320. When one of the small trays 310 is selected, a conveying path switch 354 switches the path of the printed material from the main path 350 to the main path 351. A conveying path switch 312 then switches the path from the main path 351 to a sub path 315 of the selected small tray 310. The printed material is output to the selected small tray 310 through the sub path 315. When the printed material is output to the temporary tray 330, switching of the path to the sub path is not executed by the conveying path switches provided in the main path 350. The printed material enters to the sub path of the temporary tray 330 from an end of the main path 350. When the tray 340 is selected, a conveying path switch 342 switches the path to a sub path 345 of the tray 340. In such a manner, sheets or printed materials guided to the sub paths are stacked on the trays 310, 320, 330, and 340.

A sensor 341 for detecting presence or absence of a sheet is arranged on an upstream side of the conveying path switch 342 in the main path 350. A sensor 321 for detecting presence or absence of a sheet is arranged on an upstream side of each conveying path switch 322 for the large tray 320 in the main path 350. A sensor 311 for detecting presence or absence of a sheet is arranged on an upstream side of each conveying path switch 312 for the small tray 310 in the main path 351. Sensors 313, 323, and 333 for detecting presence or absence of a sheet are also arranged in the respective sub paths. These sensors are used to detect a paper jam. In addition to detecting the paper jam, the sensors arranged on the upstream side of the corresponding conveying path switches are used by the conveying path switches to determine switching timing.

Paper-presence detecting sensors 314, 324, 334, and 344 arranged on the corresponding trays are used to detect whether operators have removed the printed material stacked on the trays.

Dotted lines parallel to the main paths or grouping the plurality of sub paths indicate independent units for driving a conveyer in the conveying path. Accordingly, stopping and driving the conveyer are executed in conjunction with each other in a range of the conveying path. For example, when a paper jam occurs in the sub path to the temporary tray 330, the conveyer to the large tray immediately under the sub path to the temporary tray 330 also stops in response to stopping of the conveyer in the sub path. Alternatively, even if a point in the main path having a paper jam is stopped, the main conveying path belonging to a different driving unit does not have to be stopped.

Figure 4:
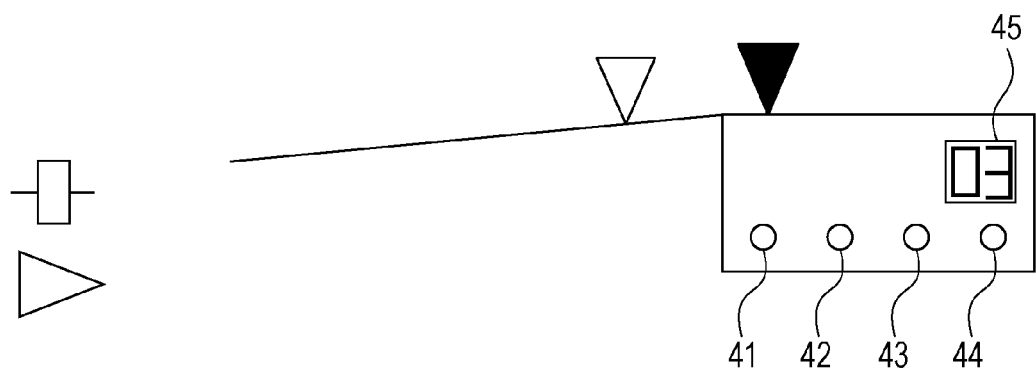
FIG. 4 is a diagram schematically illustrating a display configuration of each tray of the sorter unit.

FIG. 4 is a diagram schematically illustrating a configuration of LEDs installed in the tray illustrated in FIG. 3.

Each of the small trays 310, the large trays 320, and the temporary tray 330 illustrated in FIG. 3 includes LEDs for displaying a state of the tray. A discharge LED 41 is turned on or blinked while a sheet is being output to the tray. The print processing apparatus employed in this exemplary embodiment can execute interrupt printing by printing images input as interruption first after temporarily stopping printing of images currently underway. An interrupt LED 42 indicates a tray storing a printed material resulting from the interrupt printing. When pages of a printed material are output to a plurality of trays because the number of pages exceeds an allowable value of each tray or circumstances to be described later occur, the printed material is to be output to the tray after some time even if the tray is now vacant. When such a state is detected in advance, a reserve LED 43 indicates such a state. A job LED 44 indicates a job. More specifically, the job LED 44 indicates a tray to which a job specified through the operation unit 115 is output. The job LED 44 also indicates an order of collecting the printed materials from the trays. A display unit 45 displays a status of the tray. In accordance with this exemplary embodiment, the display unit 45 can display a two-digit figure. However, the display unit 45 is not limited to the example described in this exemplary embodiment as long as the display unit 45 can display a figure.

Accordingly, users can visually confirm a paper output state of each tray through the LEDs installed for the tray.

(Basic Sorting Flow)

Figure 5:
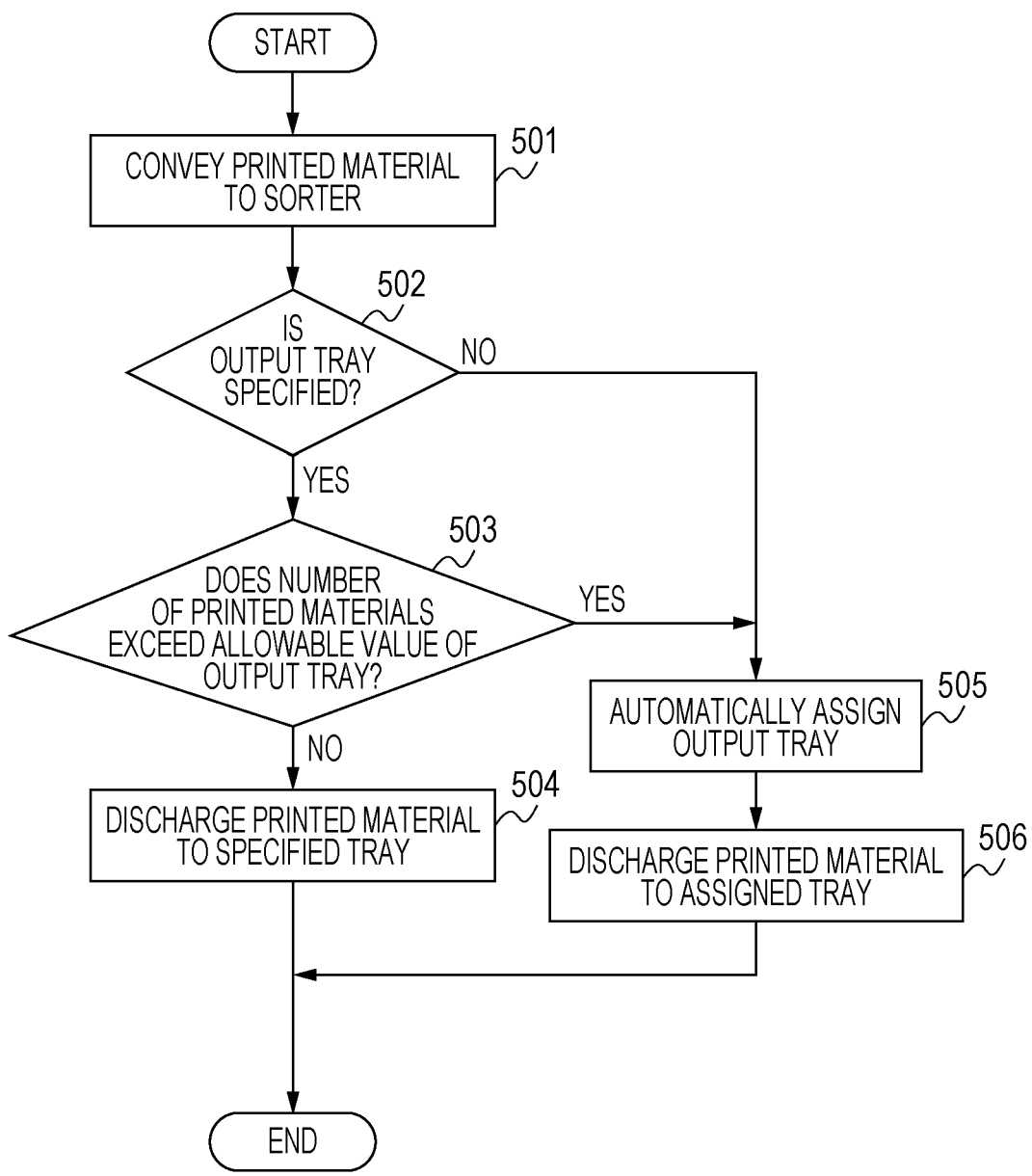
FIG. 5 is a flowchart illustrating a sorting method of the sorter unit.

FIG. 5 is a flowchart illustrating a procedure for sorting printed materials to a tray in the sorter unit 114 according to this exemplary embodiment.

In STEP 501, a piece of sheet cut from a roll sheet having images printed thereon is conveyed to the sorter unit 114.

In STEP 502, the sorter unit 114 determines whether an output tray is specified for the conveyed printed material. More specifically, the sorter unit 114 determines whether the output tray of the printed material is specified by the host apparatus 211 or the print processing apparatus 200 here. If the output tray is specified, the process proceeds to STEP 503. If the output tray is not specified, the process proceeds to STEP 505. In STEP 503, the sorter unit 114 determines whether a number of printed materials stacked on the tray specified in STEP 502 exceeds an allowable value thereof. If the number of printed materials exceeds the allowable value, the process proceeds to STEP 505. If the number of printed materials does not exceed the allowable value, the process proceeds to STEP 504. In STEP 504, the sorter unit 114 outputs the printed material to the specified tray since the printed material can be stacked on the specified tray. In contrast, in STEP 505, since the tray specified for the printed material is unavailable or the tray is not specified, the sorter unit 114 automatically assigns a tray to which the printed material is to be output. Although various assigning methods can be employed, the sorter unit 114 assigns a vacant tray or a tray storing a printed material of the same job as the printed material to be output currently.

The method illustrated in the flowchart of FIG. 5 allows the sorter unit 114 to rapidly sort and output the printed materials to the tray.

(State Notifying Unit)

Figure 6:
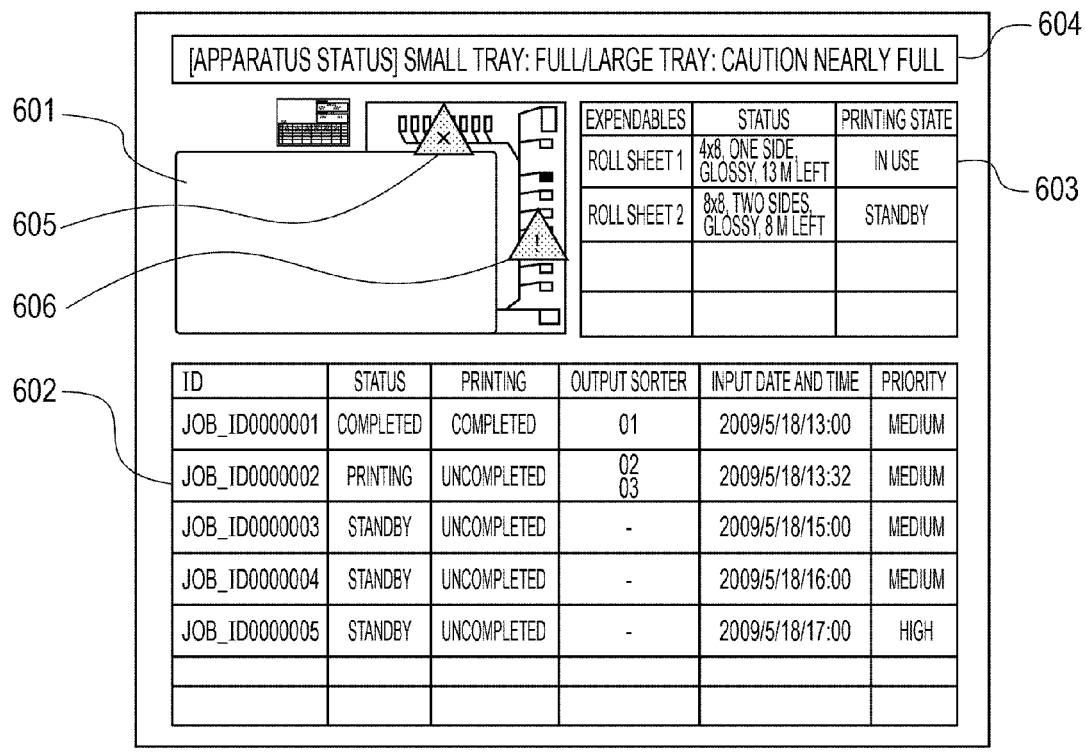
FIG. 6 is a schematic diagram illustrating a screen display method.

FIG. 6 illustrates a screen displayed in the operation unit 115 in accordance with an exemplary embodiment.

The screen illustrated in FIG. 6 is displayed on a liquid crystal display (LCD) of the operation unit 115. In this exemplary embodiment, the LCD has a touch panel thereon that allow users to perform operations by touching the activated screen.

A main body display portion 601 displays an external appearance of a main body and a state of the sorter unit 114. The states of the main body and the sorter unit 114 are displayed here. A job list display portion 602 displays a list of print jobs executed by the print processing apparatus. More specifically, the job list display portion 1102 displays information regarding a job, such as a job ID, a state of the job, and completion/incompletion of printing. An expendable state display portion 603 displays a state of expendables currently used in the print processing apparatus. An apparatus status message display portion 604 displays a warning of a trouble occurring in the print processing apparatus.

The print processing apparatus notifies users of a stack state of each type of trays through the main body display portion 601 and the apparatus status message display portion 604. More specifically, the stack state of each type of trays is collectively determined and following three tray stack states are displayed. In a vacant state, the number of vacant trays of the group of trays is more than a predetermined threshold. In a nearly full state, at least one vacant tray remains but the number of the vacant trays is equal to the predetermined threshold or less. In a full state, all of the group of trays store stacked printed materials.

For example, suppose that the print processing apparatus includes ten large trays and ten small trays. A threshold for the nearly full state is set equal to three. In such a case, if the number of vacant trays is equal to three or less, the trays are in the nearly full state. More specifically, when all of the small trays store printed images stacked thereon, the group of small trays is in the full state. When eight large trays store the printed images stacked thereon, the group of large trays is in the nearly full state. In such a case, the main body display portion 601 displays an icon 605 indicating the full state for the small trays and an icon 606 indicating the nearly full state for the large trays as illustrated in FIG. 6 to notify users of such a state. As illustrated in FIG. 6, the states of the trays are displayed in the apparatus status message display portion 604 using a message "SMALL TRAY: FULL/LARGE TRAY: CAUTION NEARLY FULL". In this way, the users can grasp the state in association with the location more easily through the overview diagram of the main body and the message and efficiently collect the stacked printed images.

(State Notifying Timing)

A flow that the sorting unit 114 notifies users of the stack state will now be described. In this exemplary embodiment, it is assumed that the print processing apparatus includes ten large trays and ten small trays and that a nearly-full-state threshold regarding the number of vacant trays is set equal to three. However, the number of the vacant trays is not limited and the nearly-full-state threshold may be other values.

Figure 7:
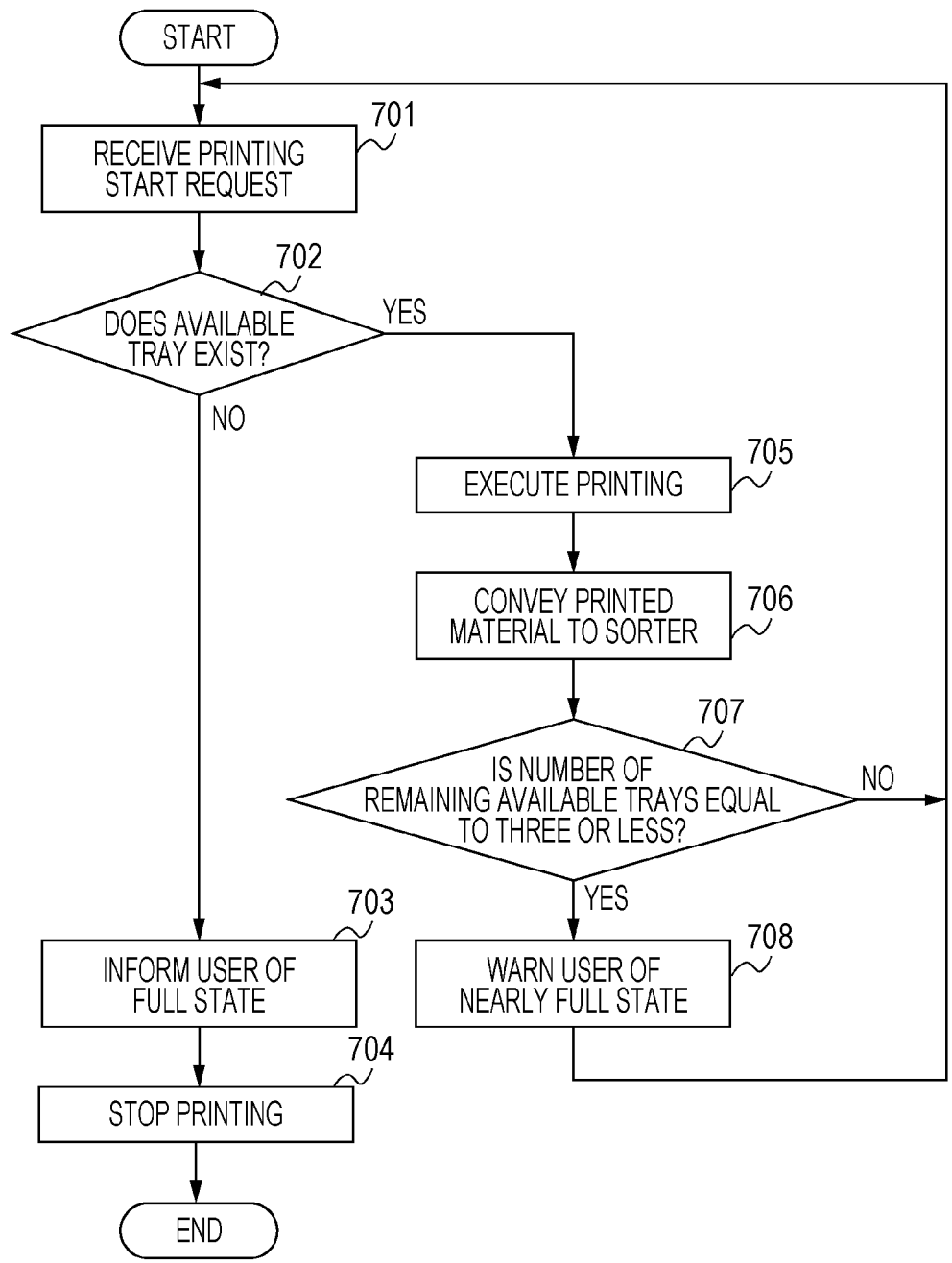
FIG. 7 is a flowchart illustrating a procedure for notifying users of a stack state of the sorter unit without a temporary tray.

FIG. 7 is a flowchart illustrating timing for notifying users of a stack state of the sorter unit 114 not having the temporary tray 330.

In STEP 701, the print processing apparatus receives a printing start request. In STEP 702, the print processing apparatus checks the stack state of each type of trays of the sorter unit 114. If there is no available tray capable of storing a material to be printed, the print processing apparatus notifies users that printing can be no longer continued because the trays are full in STEP 703. In STEP 704, the printing processing terminates.

Upon determining that there is an available tray capable of storing the material to be printed in STEP 702, the print processing apparatus executes the printing processing in STEP 705 and then conveys the printed material to the specified tray of the sorter unit 114 in STEP 706. After conveying the printed material, the print processing apparatus checks the stack state of each type of trays of the sorter unit 114 again in STEP 707. If the number of trays capable of storing the material to be printed is equal to three or less (i.e., if the number of trays storing the printed materials stacked thereon is equal to seven or more), the print processing apparatus notifies the users of a warning that printing can be continued but the trays are nearly full in STEP 708. The process then returns to STEP 701.

Upon determining that the number of trays capable of storing the material to be printed is equal to four or more in STEP 707 (i.e., the number of trays storing the stacked printed materials is less than seven), the print processing apparatus skips notifying the users of the state. The process then returns to STEP 701.

Figure 8:
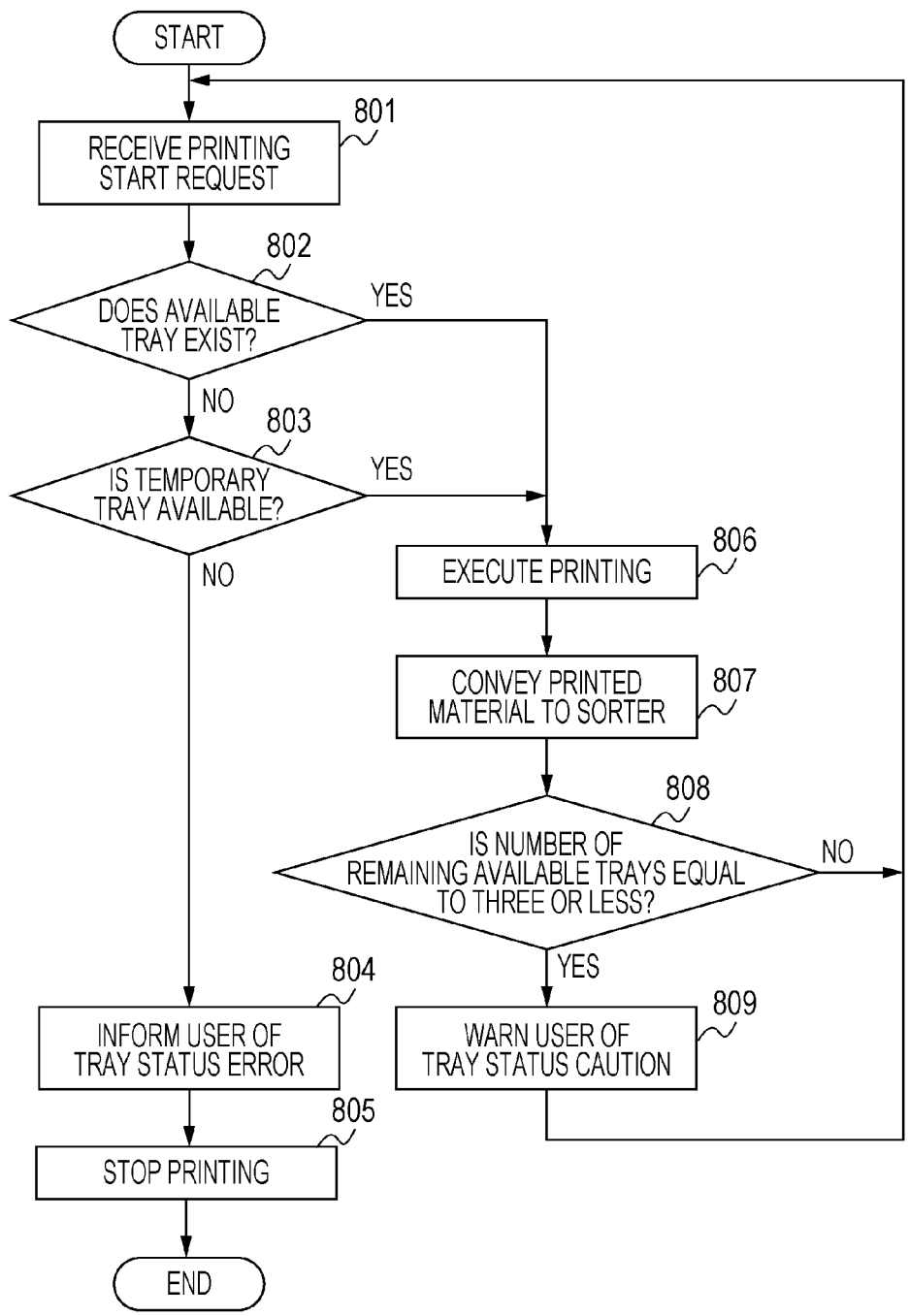
FIG. 8 is a flowchart illustrating a procedure for notifying users of the stack state of the sorter unit including a selectively used temporary tray.

FIG. 8 is a flowchart illustrating timing for notifying users of the stack state of the sorter unit 114 including a selectively used temporary tray in accordance with an exemplary embodiment.

In STEP 801, the print processing apparatus receives a printing start request. In STEP 802, the print processing apparatus checks the stack state of each type of trays of the sorter unit 114. If it is determined that there is no available tray capable of storing a material to be printed in STEP 802 and that there is no temporary tray in STEP 803, the print processing apparatus executes processing in STEP 804. More specifically, in STEP 804, the print processing apparatus notifies users that printing can be no longer continued because the trays are full. In STEP 805, the printing processing terminates.

Upon determining that there is an available tray capable of storing the material to be printed in STEP 802 or that the temporary tray is available in STEP 803, the print processing apparatus executes the printing processing in STEP 806. The print processing apparatus then conveys the printed material to the specified tray of the sorter unit 114 in STEP 807. The print processing apparatus checks the stack state of each type of trays of the sorter unit 114 again in STEP 808. If the number of trays capable of storing the materials to be printed is equal to three or less, the print processing apparatus notifies the users of a warning that printing can be continued but the trays are full or nearly full in STEP 809. The process then returns to STEP 801.

Upon determining that the number of trays capable of storing the material to be printed is four or more in STEP 808, the print processing apparatus skips notifying the users of the state. The process then returns to STEP 801.

As illustrated in FIGS. 7 and 8, by notifying the users of the stack state of the trays in steps and prompting the users to collect the printed materials, the print processing apparatus advantageously avoids the tray full state as much as possible and termination of the printing processing to the limit.

(State Notifying Message)

Figure 9:
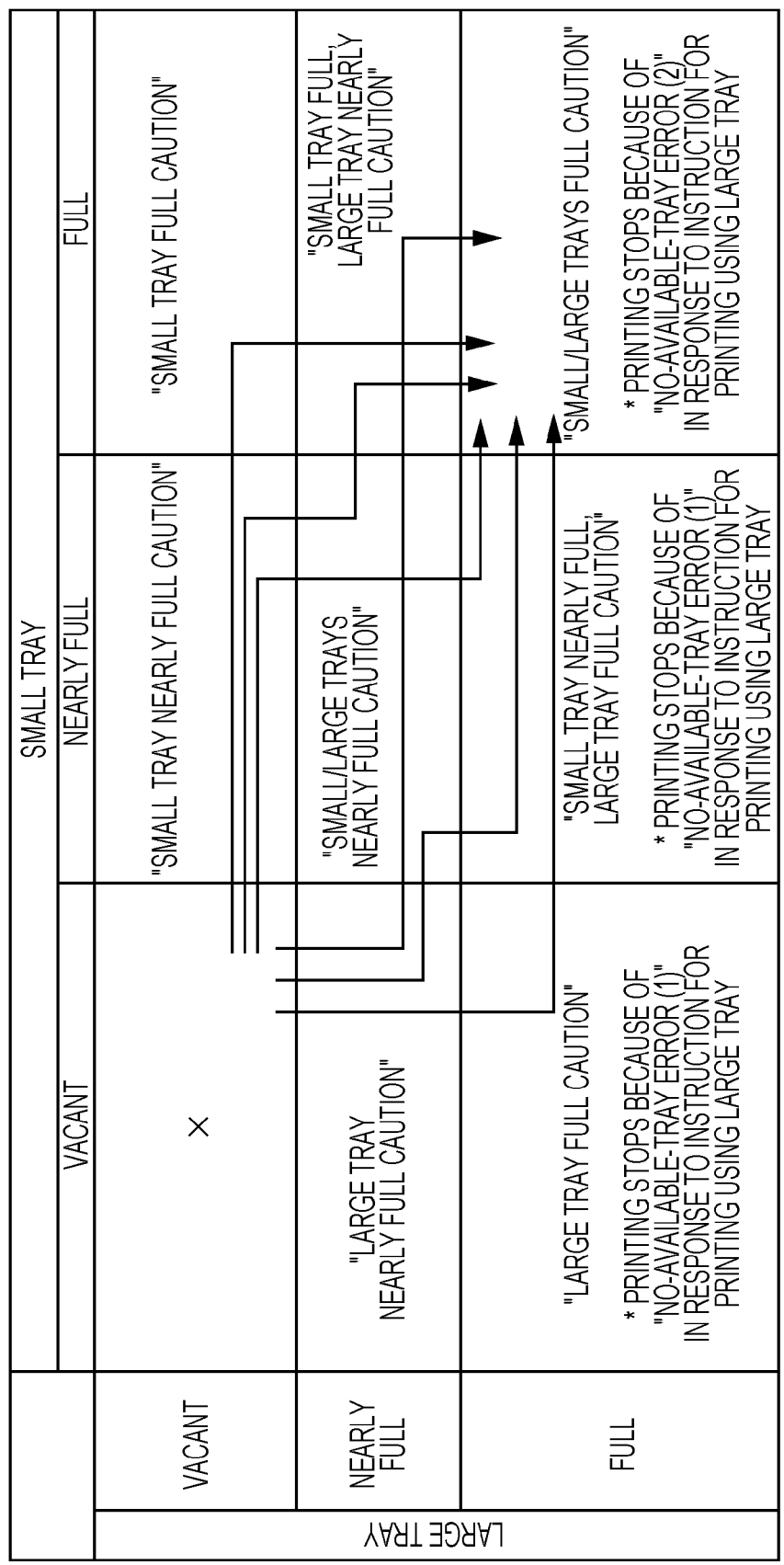
FIG. 9 is a table illustrating messages and a message display flow employed when the temporary tray is unused.

FIG. 9 is a table illustrating contents of the messages displayed at the apparatus status message display portion 604 of the operation unit 115 and a flow of displaying the messages when the temporary tray 330 is unused in accordance with an exemplary embodiment.

The print processing apparatus detects the vacant state, the nearly full state, or the full state of the small trays and the large trays, and displays a brief message expressing overall vacancy of the trays in the operation unit 115.

Figure 10:
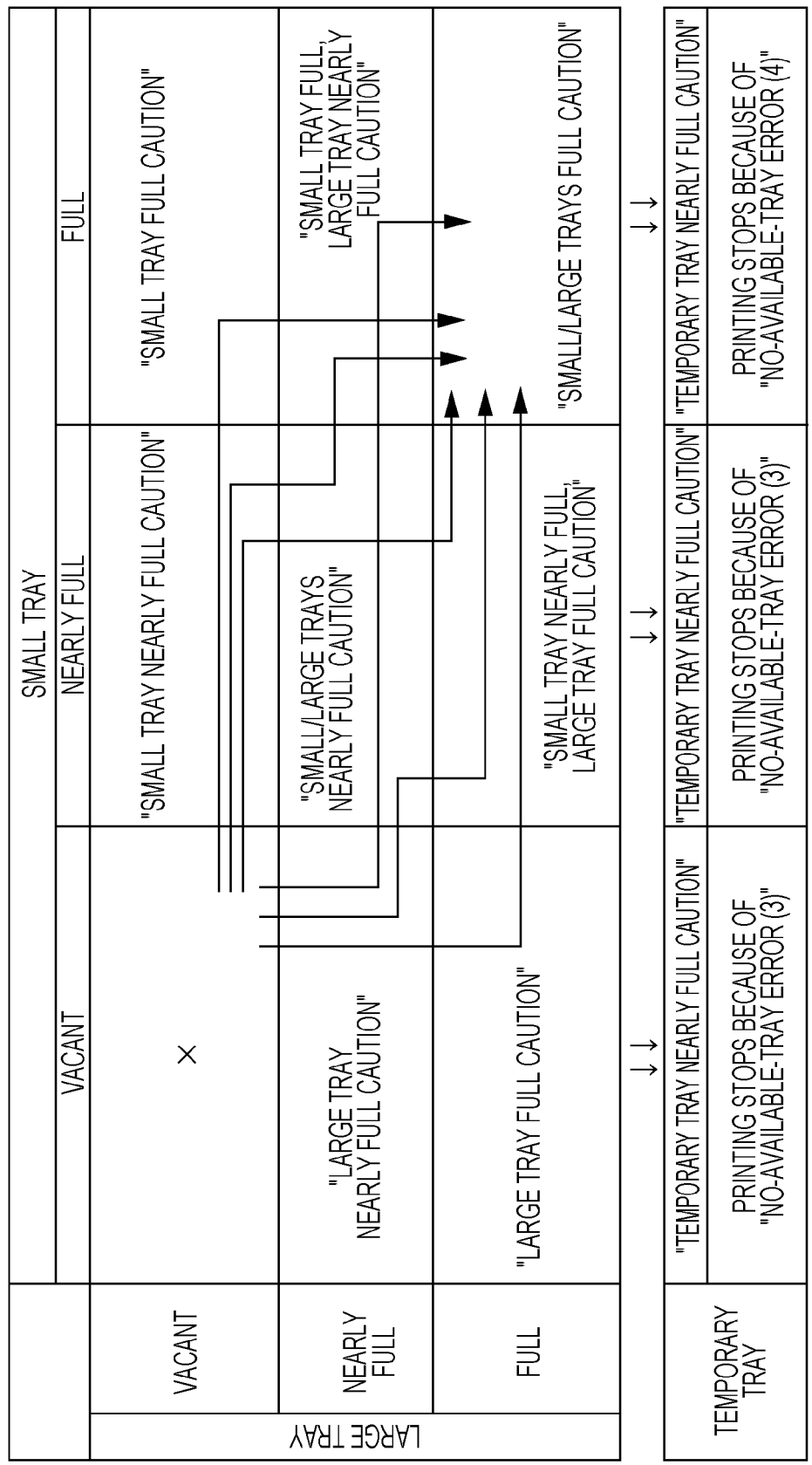
FIG. 10 is a table illustrating messages and a message display flow employed when the temporary tray is used.

FIG. 10 is a table illustrating contents of messages displayed at the apparatus status message display portion 604 of the operation unit 115 and a flow of displaying the messages when the temporary tray 330 is used in accordance with an exemplary embodiment.

As in the case of FIG. 9, the print processing apparatus detects the vacant state, the nearly full state, or the full state of the small trays and the large trays, and displays a brief message expressing overall vacancy of the trays in the operation unit 115.

When an image in large size is printed with the large trays being in the full state and when an image is printed with both the large trays and the small trays being in the full state, the temporary tray 330 is used as a paper output destination. The nearly full state and the full state of the temporary tray 330 are detected with a sensor. The users are notified of the stack state through messages.

The state display methods illustrated in FIGS. 9 and 10 allow the print processing apparatus to briefly notify the users of the overall vacancy state of the trays after collectively determining whether the trays are full. Accordingly, the users can instantly recognize the stack state of the trays through one message advantageously.

In the foregoing exemplary embodiment, one nearly-full threshold is used for the large trays and the small trays. However, when the large trays and the small trays have different frequency in use, different nearly-full conditions may be used for each size. For example, when the small trays are used more frequently, the nearly-full threshold for the number of vacant small trays may be set larger than that of the large trays. In this way, since the users are notified of the nearly full state of the more frequently used trays earlier, the possibility of avoiding the full state of the trays increases.

Second Exemplary Embodiment

A configuration, a printing operation, and a sorting operation of a print processing apparatus according to a second exemplary embodiment are similar to those of the print processing apparatus according to the first exemplary embodiment having been described with reference to FIGS. 1 to 5. Although the number of remaining vacant trays is used as a criterion of determining a nearly full state in the first exemplary embodiment, estimated time required before all trays are full is used as the criterion of determining the nearly full state in the second exemplary embodiment. More specifically, a state in which the estimated time required before all of the remaining vacant trays are used up by execution of a current job and one (or more) job (or jobs) to be executed thereafter is equal to a predetermined time threshold or shorter is determined as the nearly full state.

When the nearly full state is determined based on the number of remaining trays as in the case of the first exemplary embodiment, time required before all of the trays are used up in the nearly full state may differ depending on kinds of jobs to be executed. For example, even if three vacant trays remain, the three trays are used up in a short time by continuous execution of one-side printing jobs for a small number of copies. Conversely, it takes some time before the three trays are used up if duplex-printing jobs for a large number of copies are continuously executed. In this exemplary embodiment, information on duplex printing or one-side printing and on a number of papers to be sorted to each tray is acquired from information of one (or more) job (or jobs) to be executed. Time required before all of the remaining vacant trays are used up is determined based on the acquired information. Accordingly, this exemplary embodiment guarantees time sufficiently long enough for users to collect the printed materials.

Figure 11:
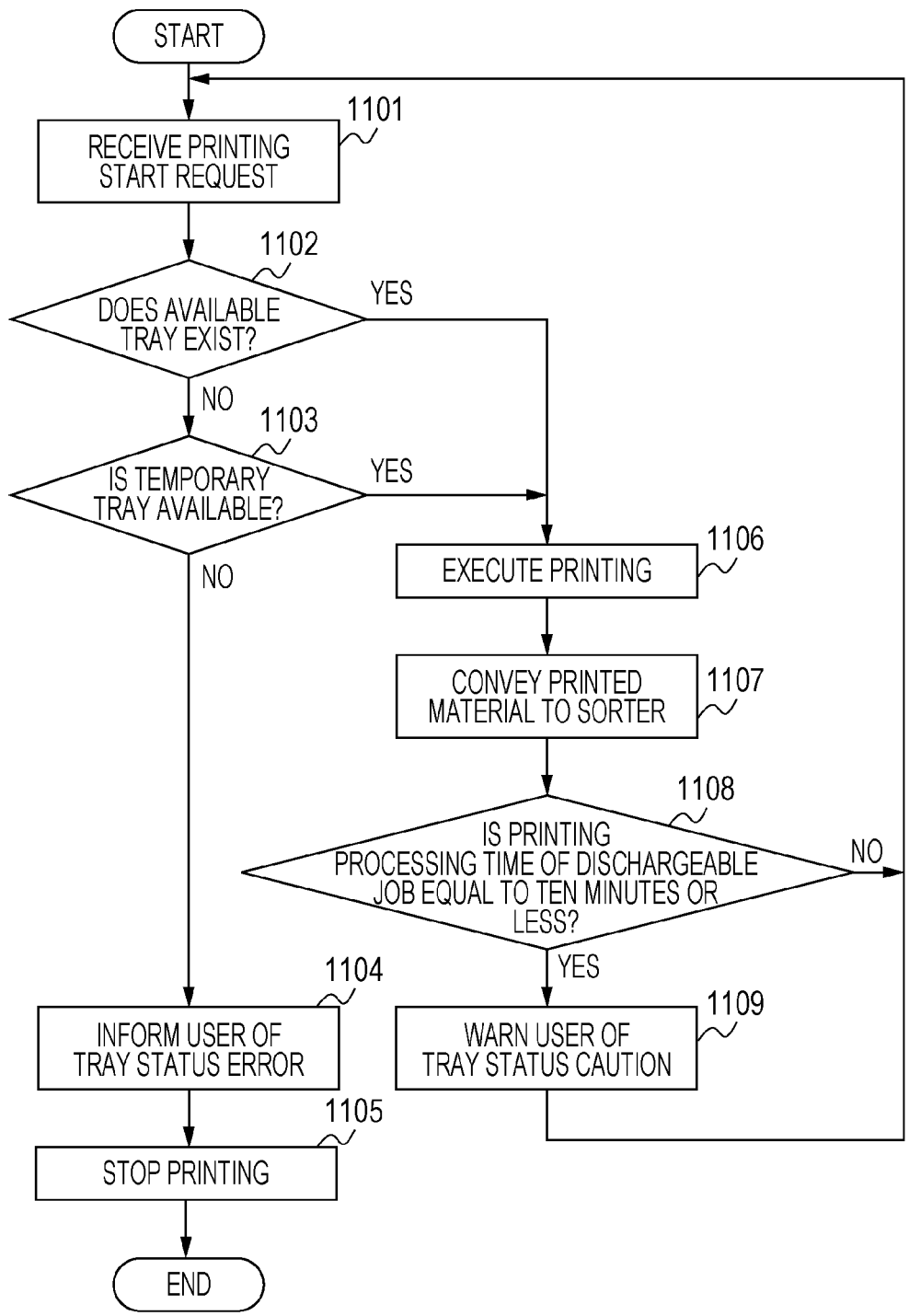
FIG. 11 is a flowchart illustrating a procedure for notifying users of a stack state of a sorter unit including a selectively used temporary tray in accordance with a second exemplary embodiment.

FIG. 11 is a flowchart illustrating timing for notifying users of a stack state of a sorter unit 114 including a selectively used temporary tray in accordance with the second exemplary embodiment. In this exemplary embodiment, a nearly full state is defined as a state where print processing time required before all of the remaining vacant trays are used up by jobs to be executed is equal to ten minutes or shorter.

In STEP 1101, the print processing apparatus receives a printing start request. In STEP 1102, the print processing apparatus checks a stack state of each type of trays of the sorter unit 114. If it is determined that there is no available tray capable of storing a material to be printed in STEP 1102 and that the temporary tray is unavailable in STEP 1103, the print processing apparatus executes processing in STEP 1104. More specifically, in STEP 1104, the print processing apparatus notifies users that printing can be no longer continued because the trays are full. In STEP 1105, the printing processing terminates.

Upon determining that there is an available tray capable of storing the material to be printed in STEP 1102 or that the temporary tray is available in STEP 1103, the print processing apparatus executes the printing processing in STEP 1106. The print processing apparatus then conveys the printed material to the specified tray of the sorter unit 114 in STEP 1107. The print processing apparatus checks the stack state of each type of trays of the sorter unit 114 again in STEP 1108. More specifically, the print processing apparatus calculates time required before all of the trays are used up by printing processing of a current job and one (or more) job (or jobs) to be executed thereafter. If the calculated time is equal to ten minutes or shorter, the print processing apparatus notifies the users of a warning that printing can be continued but the trays are nearly full in STEP 1109. The process then returns to STEP 1101.

Upon determining that all of the trays are not used up after ten minutes of executing the jobs to be printed in STEP 1108, the print processing apparatus skips notifying the users of the state. The process then returns to STEP 1101.

In this exemplary embodiment, a plurality of trays capable of storing output papers are preferably left in the nearly full state.

This exemplary embodiment can be combined with the first exemplary embodiment. For example, suppose that the print processing apparatus having ten trays is set to determine that the trays are nearly full if the number of vacant trays decreases to three. The print processing apparatus determines that the trays are nearly full if seven trays are used up. However, if six trays are used up but the time required before the four remaining trays are used up is equal to ten minutes or shorter, the print processing apparatus determines that the trays are nearly full. That is, both the threshold regarding the number of vacant trays and the threshold regarding the time to the full state are set. If the value reaches the corresponding one of the thresholds, the print processing apparatus determines that the trays are nearly full.

Third Exemplary Embodiment

A configuration, a printing operation, and a sorting operation of a print processing apparatus according to a third exemplary embodiment are similar to those of the print processing apparatus according to the first exemplary embodiment having been described with reference to FIGS. 1 to 5. In the third exemplary embodiment, the number of sheets that can be printed before all trays are full is used as a criterion of determining a nearly full state. More specifically, a state in which the number of sheets that can be printed before all of the remaining vacant trays are used up by execution of a current job and one (or more) jobs (or jobs) to be executed thereafter is equal to a predetermined threshold or less is determined as the nearly full state.

In this exemplary embodiment, information on duplex printing or one-side printing and on a number of sheets to be sorted to each tray is acquired from information of one (or more) job (jobs) to be executed. The number of sheets that can be printed before all of the remaining vacant trays are used up is determined based on the acquired information. Accordingly, this exemplary embodiment guarantees time sufficiently long enough for users to collect printed materials.

Figure 12:
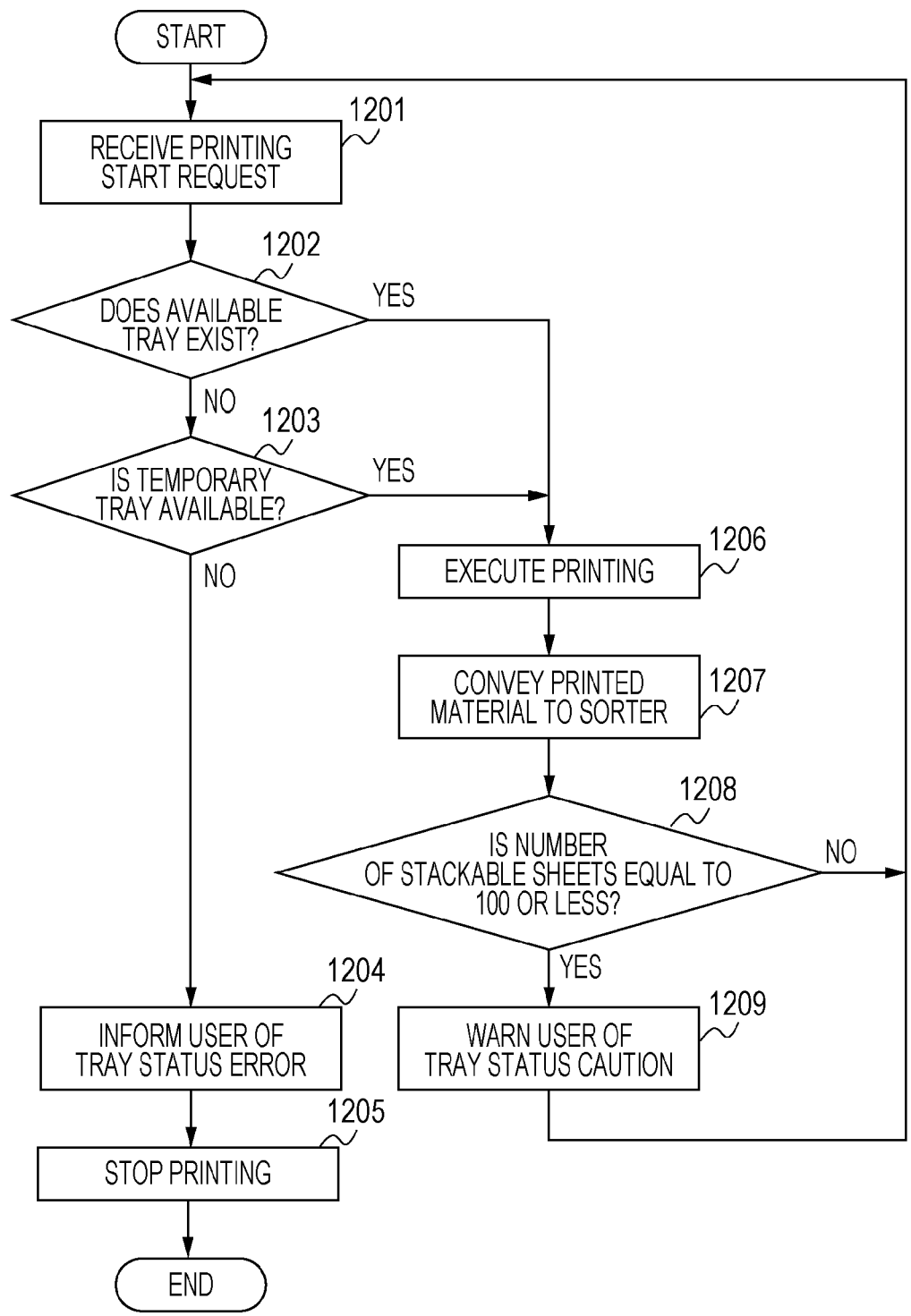
FIG. 12 is a flowchart illustrating a procedure for notifying users of a stack state of a sorter unit including a selectively used temporary tray in accordance with a third exemplary embodiment.

FIG. 12 is a flowchart illustrating timing for notifying users of a stack state of a sorter unit 114 having a selectively used temporary tray in accordance with the third exemplary embodiment. In this exemplary embodiment, the nearly full state is defined as a state where the number of sheets that can be stacked in the sorting unit 114 is equal to 100 or less.

In STEP 1201, the print processing apparatus receives a printing start request. In STEP 1202, the print processing apparatus checks a stack state of each type of trays of the sorter unit 114. If it is determined that there is no available tray capable of storing a material to be printed in STEP 1202 and that the temporary tray is unavailable in STEP 1203, the print processing apparatus executes processing in STEP 1204. More specifically, in STEP 1204, the print processing apparatus notifies the users that printing can be no longer continued because the trays are full. In STEP 1205, the printing processing terminates.

Upon determining that there is an available tray capable of storing the material to be printed in STEP 1202 or that the temporary tray is available in STEP 1203, the print processing apparatus executes the printing processing in STEP 1206. The print processing apparatus then conveys the printed material to the specified tray of the sorter unit 114 in STEP 1207. The print processing apparatus checks the stack state of each type of trays of the sorter unit 114 again in STEP 1208. More specifically, the print processing apparatus calculates the number of sheets that can be stacked in the sorting unit 114 before all of the remaining vacant trays are used up by printing processing of a current job and one (or more) job (or jobs) to be executed thereafter. If the calculated value is equal to 100 or less, the print processing apparatus notifies the users of a warning that printing can be continued but the trays are full or nearly full in STEP 1209. The process then returns to STEP 1201.

Upon determining that the number of sheets that can be stacked in the sorter unit 114 exceeds 100 in STEP 1208, the print processing apparatus skips notifying the users of the state. The process then returns to STEP 1201.

In this exemplary embodiment, a plurality of trays capable of storing output papers are preferably left in the nearly full state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-071939 filed Mar. 26, 2010, which is hereby incorporated by reference herein in its entirety.

What is claimed is:

1. A printing apparatus comprising:
an image forming unit configured to form an image on a sheet to create a printed material;
a stacking unit including a plurality of trays for stacking the printed material created by the image forming unit, wherein each tray is one type of a plurality of types of trays;
a detecting unit configured to detect, for a given type of tray, whether each tray in the given type of tray is able to receive additional printed material; and
a notifying unit configured to notify a warning,
wherein, in a case where a number of trays in the given type of tray that are able to receive additional printed material as detected by the detecting unit is less than a predetermined number, the notifying unit notifies the warning such that the warning is distinguishable according to the type of tray for which the warning is notified.

2. The printing apparatus according to claim 1, further comprising a determining unit configured to determine that a group of trays is in a nearly full state when time required before the trays are used up by (i) a currently executed job and (ii) a job to be executed thereafter is equal or less than a second predetermined value.

3. The printing apparatus according to claim 2,
wherein the group of trays includes a plurality of types of trays, wherein each type of tray is capable of stacking printed materials in different sizes,
wherein the determining unit determines whether the tray in each of the different sizes is in the nearly full state,
wherein, for each tray of the different sizes in the nearly full state, the notifying unit displays, as the warning on a display unit, a message indicating the nearly full state of the tray in each different size.

4. The printing apparatus according to claim 3, wherein a condition used by the determining unit to detect the nearly full state differs for the tray in each of the different sizes.

5. The printing apparatus according to claim 2, further comprising a temporary tray configured to stack a printed material when the group of trays is incapable of stacking the printed material.

6. The printing apparatus according to claim 2, further comprising a second tray capable of stacking a print material that is larger than that stacked in the group of trays, wherein the printing apparatus is configured to be set so that the second tray stacks a printed material when the group of trays is incapable of stacking the printed material.

7. The printing apparatus according to claim 1, further comprising a determining unit configured to determine that a group of trays is in a nearly full state when a number of printed material that can be printed before the trays are used up by (i) a currently executed job and (ii) a job to be executed thereafter is equal to or less than a third predetermined value.

8. The printing apparatus according to claim 1, wherein the notifying unit notifies that the stacking unit is in a nearly full state in a case where the number of trays in the given type of tray that are able to receive additional printed material is 1 to n, wherein n is an integer equal to or greater than two.

9. A method for a printing apparatus, the method comprising:
forming an image on a sheet to create a printed material;
stacking, using a plurality of trays, the created printed material, wherein each tray is one type of a plurality of types of trays;
detecting, for a given type of tray, whether each tray in the given type of tray is able to receive additional printed material; and
notifying a warning,
wherein, in a case where a number of trays in the given type of tray that are able to receive additional printed material as detected by the detecting is less than a predetermined number, notifying includes notifying the warning such that the warning is distinguishable according to the type of tray for which the warning is notified.

10. The method according to claim 9, further comprising determining that a group of trays is in a nearly full state when time required before the trays are used up by (i) a currently executed job and (ii) a job to be executed thereafter is equal or less than a second predetermined value.

11. The method according to claim 10,
wherein the group of trays includes a plurality of types of trays, wherein each type of tray is capable of stacking printed materials in different sizes,
wherein determining includes determining whether the tray in each of the different sizes is in the nearly full state,
wherein, for each tray of the different sizes in the nearly full state, notifying includes displaying, as the warning, a message indicating the nearly full state of the tray in each different size.

12. The method according to claim 11, wherein a condition used to detect the nearly full state differs for the tray in each of the different sizes.

13. The method according to claim 10, further comprising stacking, using a temporary tray, a printed material when the group of trays is incapable of stacking the printed material.

14. The method according to claim 10, further comprising stacking, using a second tray, a print material that is larger than that stacked in the group of trays, wherein the printing apparatus is configured to be set so that the second tray stacks a printed material when the group of trays is incapable of stacking the printed material.

15. The method according to claim 9, further comprising determining that a group of trays is in a nearly full state when a number of printed material that can be printed before the trays are used up by (i) a currently executed job and (ii) a job to be executed thereafter is equal to or less than a third predetermined value.

16. The method according to claim 9, wherein notifying includes notifying that the plurality of trays is in a nearly full state in a case where the number of trays in the given type of tray that are able to receive additional printed material is 1 to n, wherein n is an integer equal to or greater than two.

* * * * *